(12) United States Patent
Heo

(10) Patent No.: US 9,493,125 B2
(45) Date of Patent: Nov. 15, 2016

(54) APPARATUS AND METHOD FOR CONTROLLING OF VEHICLE USING WEARABLE DEVICE

(71) Applicant: Hyundai Motor Company, Seoul (KR)

(72) Inventor: Keun Hang Heo, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/684,728

(22) Filed: Apr. 13, 2015

(65) Prior Publication Data

US 2016/0107591 A1    Apr. 21, 2016

(30) Foreign Application Priority Data

Oct. 17, 2014    (KR) .................. 10-2014-0140717

(51) Int. Cl.
*G06F 21/32* (2013.01)
*B60R 16/023* (2006.01)

(52) U.S. Cl.
CPC .................. *B60R 16/023* (2013.01)

(58) Field of Classification Search
CPC ........ G06F 1/163; G06F 3/017; G06F 21/32; G06K 9/00201; G06K 9/00268; G06K 9/00355; G06K 9/00; G06K 19/00; G07C 9/00563; G07C 9/00658; G07C 2209/64
USPC ............. 701/1–2, 36; 455/41.2, 41.1, 556.1; 345/158, 173; 382/106, 225
See application file for complete search history.

(56) References Cited

U.S. PATENT DOCUMENTS

| | | | |
|---|---|---|---|
| 8,725,842 B1* | 5/2014 | Al-Nasser | G04G 17/08 367/11 |
| 8,744,645 B1* | 6/2014 | Vaghefinazari | G01C 21/3608 701/1 |
| 2013/0246967 A1 | 9/2013 | Wheeler et al. | |
| 2014/0146178 A1 | 5/2014 | Kim et al. | |
| 2015/0120151 A1* | 4/2015 | Akay | B60R 25/24 701/49 |
| 2015/0332532 A1* | 11/2015 | Lee | G07C 9/00563 340/5.72 |

FOREIGN PATENT DOCUMENTS

| | | |
|---|---|---|
| KR | 2013-0063662 A | 6/2013 |
| KR | 2013-0086192 A | 7/2013 |
| KR | 2014-0068431 A | 6/2014 |

OTHER PUBLICATIONS

Jang, Sunwon "Controlling Genesis 2015 by Google Glass" E-dailiy News Article dated Jan. 3, 2014, English translation, 3 pages.

* cited by examiner

*Primary Examiner* — Dalena Tran
(74) *Attorney, Agent, or Firm* — Mintz Levin Cohn Ferris Glovsky and Popeo, P.C.; Peter F. Corless

(57) ABSTRACT

An apparatus for controlling a vehicle includes: a communication module configured to perform wireless communication between a wearable device and at least one vehicle device provided in the vehicle; and a control module configured to control the at least one vehicle device based on an operation of the wearable device.

17 Claims, 4 Drawing Sheets

APPARATUS AND METHOD FOR CONTROLLING OF VEHICLE USING WEARABLE DEVICE

CROSS-REFERENCE TO RELATED APPLICATION

This application claims the benefit of and priority to Korean Patent Application No. 10-2014-0140717, filed on Oct. 17, 2014 in the Korean Intellectual Property Office, the disclosure of which is incorporated herein in its entirety by reference.

TECHNICAL FIELD

The present disclosure relates to an apparatus and a method for controlling a vehicle using a wearable device, and more particularly, to an apparatus and a method for controlling a vehicle using a wearable device capable of controlling a vehicle device, such as an audio-video-navigation (AVN) system or an air conditioning operating system.

BACKGROUND

Various functions are performed in typical vehicles, such as opening or closing a door, opening or closing a window, and the like. Recently, such functionality has become controllable using a remote controller. For instance, functions such as the operation of an audio-video-navigation (AVN) system, as well as the opening or closing of a door or window, may be controlled. However, when using the remote controller as described above while the vehicle is being driven, an accident can be caused due to the driver being distracted.

SUMMARY

The present disclosure has been made to solve the above-mentioned problems occurring in the related art while advantages achieved by the related art are maintained intact.

An aspect of the present disclosure provides an apparatus and a method for controlling a vehicle using a wearable device, such as smart glasses worn by the driver, capable of controlling a vehicle device provided in the vehicle.

According to embodiments of the present disclosure, an apparatus for controlling a vehicle includes: a communication module configured to perform wireless communication between a wearable device and at least one vehicle device provided in the vehicle; and a control module configured to control the at least one vehicle device based on an operation of the wearable device.

The wearable device may be smart glasses.

The control module may be further configured to select the at least one vehicle device based on first operation information of the smart glasses.

The first operation information may be generated based on one or more of: a position of the smart glasses, a gaze point of a user wearing the smart glasses, an image of the at least one vehicle device projected on the smart glasses, and an image of a mark attached to the at least one vehicle device projected on the smart glasses.

The control module may be further configured to provide a menu for the selected at least one vehicle device to the smart glasses.

The control module may be further configured to confirm a selection signal for the menu based on second operation information of the smart glasses and to perform a function corresponding to the selection signal.

The second operation information may be generated based on one or more of: a gaze point of a user wearing the smart glasses, a blink of the user, movement of a pupil of the user, a touch of the smart glasses, and a voice of the user.

The first operation information may be generated from one or more of the smart glasses and the apparatus for controlling the vehicle.

The second operation information may be generated from one or more of the smart glasses and the apparatus for controlling the vehicle.

The at least one vehicle device provided in the vehicle may include one or more of: an audio-video-navigation (AVN) system, a window switch, a door switch, an air conditioning operating system, and a sheet operating system.

Furthermore, according to embodiments of the present disclosure, a method for controlling a vehicle includes: performing wireless communication with a wearable device; confirming an operation of the wearable device; and controlling at least one vehicle device provided in the vehicle based on the operation of the wearable device.

The method for controlling a vehicle may further include, after the performing of the wireless communication, confirming first operation information of smart glasses, which is the wearable device; and selecting the at least one vehicle device based on the first operation information.

The first operation information may be generated based on one or more of: a position of the smart glasses, a gaze point of a user wearing the smart glasses, an image of the at least one vehicle device projected on the smart glasses, and an image of a mark attached to the at least one vehicle device projected on the smart glasses.

The method for controlling a vehicle may further include, after the selecting of the at least one vehicle device, providing a menu for the selected at least one vehicle device to the smart glasses.

The controlling of the at least one vehicle device may include: confirming second operation information of the smart glasses after the providing of the menu to the smart glasses; and confirming a selection signal for the menu based on the second operation information, the at least one vehicle device being controlled by a function corresponding to the selection signal.

The second operation information may be generated based on one or more of: a gaze point of a user wearing the smart glasses, a blink of the user, movement of a pupil of the user, a touch of the smart glasses, and a voice of the user.

Furthermore, according to embodiments of the present disclosure, a non-transitory computer readable medium containing program instructions for controlling a vehicle includes: program instructions that perform wireless communication with a wearable device; program instructions that confirm an operation of the wearable device; and program instructions that control at least one vehicle device provided in the vehicle based on the operation of the wearable device.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
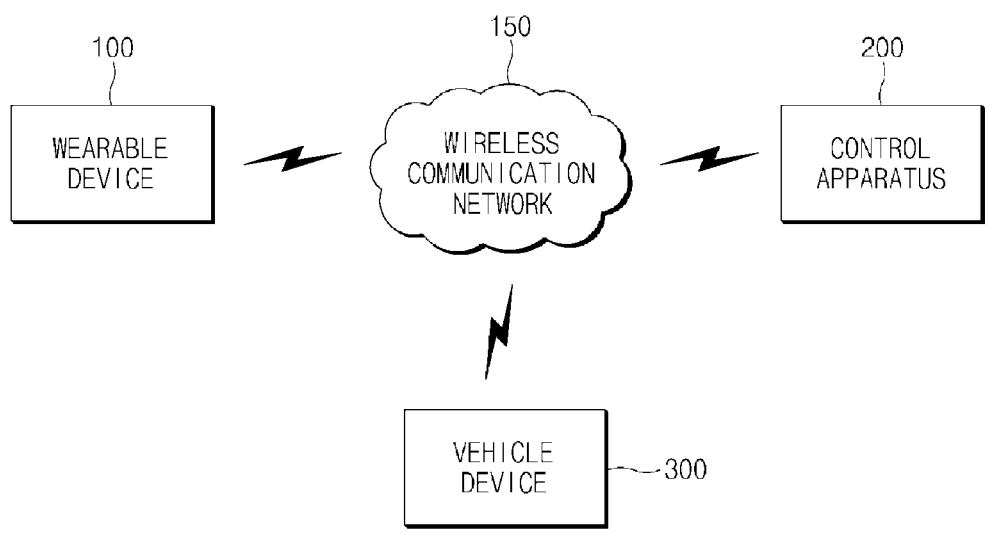
FIG. 1 is a view showing a system for performing a vehicle control using a wearable device according to embodiments of the present disclosure.

Hereinafter, embodiments of the present disclosure will be described with reference to the accompanying drawings. The presently disclosed embodiments of the present disclosure may be variously modified. Specific embodiments have been shown in the accompanying drawings and a detailed description therefor will be provided. However, it is to be understood that the present disclosure is not limited to specific embodiments, but include all modifications, equivalents, and substitutions included in the spirit and the scope of the present disclosure. Throughout the accompanying drawings, similar components will be denoted by similar reference numerals.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control module. The term "control module" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control module in conjunction with other components.

Furthermore, the control module of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 2:
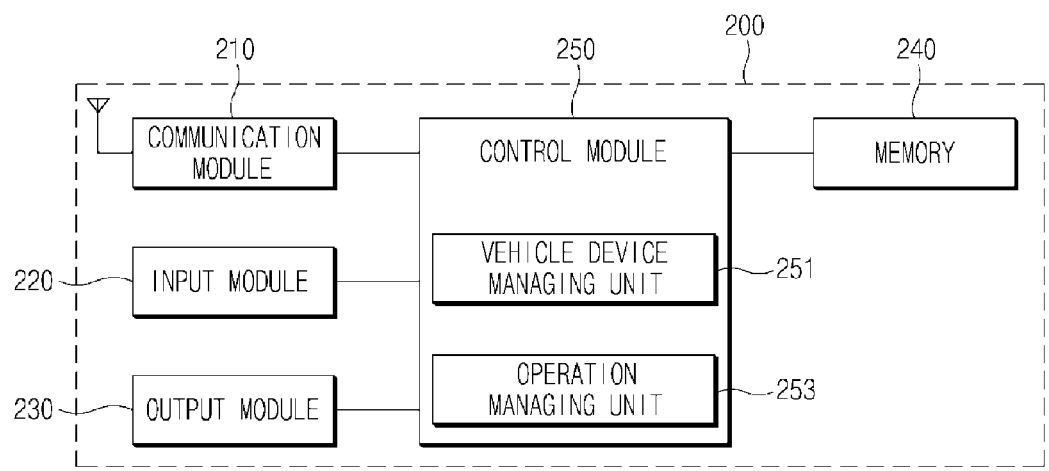
FIG. 2 is a view showing main components of an apparatus for controlling a vehicle using a wearable device according to embodiments of the present disclosure.
Figure 3:
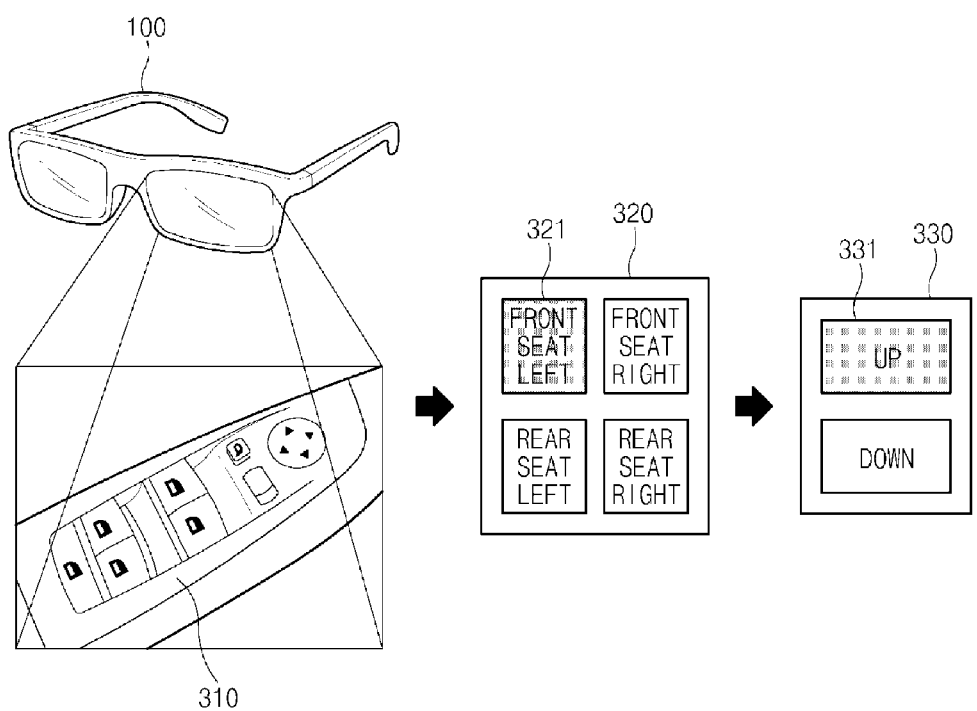
FIG. 3 is a view showing an example of a vehicle control using a wearable device according to embodiments of the present disclosure.

Referring to FIGS. 1 to 3, a system 10 for performing a vehicle control using a wearable device according to embodiments of the present disclosure may be configured to include a wearable device 100, a wireless communication network 150, a control apparatus 200, and at least one vehicle device 300.

The wearable device 100, which may be smart glasses, may be worn by a driver or a user that is to control the vehicle device 300. In addition, in embodiments of the present disclosure, the smart glasses and the wearable device 100 are used as the same meaning, but are not necessarily limited thereto. Alternatively, the wearable device 100 may be other apparatuses such as a smart watch, and the like.

The smart glasses 100 (or other wearable device) may be connected to the control apparatus 200 through the wireless communication network 150 to perform wireless communication. The smart glasses 100 may capture an image projected thereon and provide the image to the control apparatus 200. Here, the image may include an image for the vehicle device 300, an image for a mark attached to the vehicle device 300, and an image for an eyeball of a user wearing the smart glasses 100. When it is confirmed that a change is not generated in the image projected on the smart glasses 100 for a threshold time, the smart glasses 100 may capture the projected image. In addition, the smart glasses 100 may include a camera (not shown) and provide eyeball information of the user obtained from the camera to the control apparatus 200. For example, the smart glasses 100 may provide an image including a window switch 310 projected on the smart glasses 100 to the control apparatus 200, as shown in FIG. 3.

The control apparatus 200 may perform wireless communication with the smart glasses 100 and at least one vehicle device 300 provided in the vehicle through the wireless communication network 150. The control apparatus 200 may control at least one vehicle device 300 based on an operation of the smart glasses 100. To this end, the control apparatus 200 may include a communication module 210, an input module 220, an output module 230, a memory 240, and a control module 250, wherein the control module 250 may include a vehicle device managing unit 251 and an operation managing unit 252.

Although the case in which the control apparatus 200 serves to relay the smart glasses 100 and the vehicle device 300 has been described in embodiments of the present disclosure, the present disclosure is not necessarily limited thereto. In the case in which the vehicle device 200 and the smart glasses 100 may directly communicate with each other, the vehicle device 200 may directly receive a selection signal from the smart glasses 100 while bypassing the control apparatus 200 to control an operation. The control apparatus 200 may be any one of, for example, the vehicle devices 300 provided in the vehicle, such as an audio-video-navigation (AVN) system. The control apparatus 200 may be an external apparatus such as a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, or the like.

The communication module 210 may perform communication with the smart glasses 100 through short distance wireless communication such as Bluetooth, or the like. The communication module 210 may perform communication with the vehicle device 300 through communication such as a controller area network (CAN), a CAN with flexible data rate (CAN-FD), a FlexRay, a media oriented systems transport (MOST), a time triggered (TT) Ethernet, or the like.

The input module 220 generates a control signal depending on an input from the outside. To this end, the input module 220 may be formed of an input apparatus such as a keypad, a touchpad, a touch screen, or the like. In the case in which the input module 220 is formed of the touch screen, the input module 220 may also perform a function of the output module 230.

The output module 230 may output a menu image for editing the menu image that may manipulate at least one vehicle device 300 provided in the vehicle. To this end, the output module 230 may be formed of an output apparatus such as a liquid crystal display (LCD), a touch screen, or the like. For example, the menu image may be a menu that may control the window switch 310 provided from the smart glasses 100, such as 320 and 330 of FIG. 3. Here, the menu image may be edited by the control signal generated by the input module 220 and be configured in a form simpler than that of an actual configuration of the window switch 310.

The memory 240 may store a program for operating the control apparatus 200, or the like, therein. Particularly, the memory 240 may store an image of an appearance of the vehicle device 300 by a control of the control module 250 therein, and in the case in which a mark is allocated to the vehicle device 300, the mark and the vehicle device 300 may be mapped to each other and be stored. The memory 240 may store a position of the vehicle device 300 therein. The menu image that may manipulate at least one vehicle device 300 provided in the vehicle may be stored in the memory 240.

The vehicle device managing unit 251 may perform communication with at least one vehicle device 300 provided in the vehicle using CAN communication. According to an exemplary embodiment, the vehicle device managing unit 251 may obtain the image of the appearance of the vehicle device 300. According to embodiments, the vehicle device managing unit 251 may confirm different marks attached to each of the vehicle devices 300 to map the marks to the vehicle devices 300.

The vehicle device managing unit 251 may confirm a position of the vehicle device 300 within the vehicle and store the menu image that may manipulate the vehicle device 300 in the memory 240. Here, the menu image may be received from an external server (not shown) or from the vehicle device 300.

The vehicle device managing unit 251 may perform communication with the smart glasses 100 using Bluetooth communication and confirm the vehicle device 300, which is a control target that is to be controlled through the smart glasses 100 based on first operation information of the smart glasses 100. Here, the first operation information may be generated as information on any one of a position of the smart glasses 100, a gaze point of the user wearing the smart glasses 100, an image of the vehicle device 300 projected on the smart glasses 100, and an image of the mark attached to the vehicle device 300 projected on the smart glasses 100.

The vehicle device managing unit 251 may receive the image including the vehicle device 300 projected on the smart glasses 100 from the smart glasses 100. The vehicle device managing unit 251 may analyze the image to extract the vehicle device 300 of which the image of the appearance stored in the memory 240 is the same as the image. The vehicle device managing unit 251 may confirm the extracted vehicle device 300 as a control target.

The vehicle device managing unit 251 may receive the image including the mark attached to the vehicle device 300 from the smart glasses 100. The vehicle device managing unit 251 may extract the mark from the image and extract the vehicle device 300 mapped to the mark from the memory 240. The vehicle device managing unit 251 may confirm the extracted vehicle device 300 as a control target.

The vehicle device managing unit 251 may receive the image including position information of the smart glasses 100 or an eyeball of the user from the smart glasses 100. Here, the position information of the smart glasses 100 may be direction information of the smart glasses 100. To this end, the smart glasses 100 may include a sensor that may confirm the direction information, such as a gyro sensor, or the like. The vehicle device managing unit 251 may confirm the vehicle device 300, which is the control target, from the position information or the image.

The vehicle device managing unit 251 may receive an image of the eyeball of the user obtained from a camera included in the smart glasses 100. The vehicle device managing unit 251 may confirm eyeball movement information in the image and extract the vehicle device 300 that the user is to control based on the eyeball movement information. The vehicle device managing unit 251 may confirm the extracted vehicle device 300 as a control target.

Although the case in which the first operation information is generated in the control apparatus 200 has been described in embodiments of the present disclosure, the present disclosure is not necessarily limited thereto. That is, the first operation information may also be generated by analyzing the above-mentioned information in the smart glasses 100. The control apparatus 200 may confirm the vehicle device 300, which is the control target that is to be controlled through the smart glasses 100 based on the first operation information generated in the smart glasses 100.

The vehicle device managing unit 251 may extract the menu image for manipulating the vehicle device 300 confirmed as the control target from the memory 240. The vehicle device managing unit 251 may provide the extracted menu image to the smart glasses 100.

The operation managing unit 252 may control an operation of the vehicle device 300 based on second operation information of the smart glasses 100. Here, the second operation information may be generated from information such as a gaze point of the user wearing the smart glasses 100, blink of the user, movement of a pupil of the user, a touch of the smart glasses 100, a voice of the user, and the like. For example, in the case in which the vehicle device 300 selected as the control target by the information provided from the smart glasses 100 is the window switch 310, the vehicle device managing unit 251 may provide the menu image such as 320 of FIG. 3 to the smart glasses 100. When the second operation information on a front seat left 321 in an upper menu image 320 is received, the operation managing unit 252 may provide a lower menu image 330 on the front seat left 321 to the smart glasses 100. When second operation information for an UP 331 for rolling up a window in the lower menu image 330 is received, the operation managing unit 252 may roll up the window positioned at the front seat left of the vehicle depending on the second operation information.

Although the case in which the second operation information is generated in the control apparatus 200, similar to the first operation information, has been described in an exemplary embodiment of the present disclosure, the present disclosure is not necessarily limited thereto. That is, the second operation information may also be generated by analyzing the above-mentioned information in the smart glasses 100.

The vehicle device 300, which is a device provided in the vehicle, may include an AVN system, a window switch, a door switch, an air conditioning operating system, and a sheet operating system. The vehicle device 300 may be connected to the control apparatus 200 through the CAN communication, or the like. The vehicle device 300 may be operated by the control signal received from the control apparatus 200.

Figure 4:
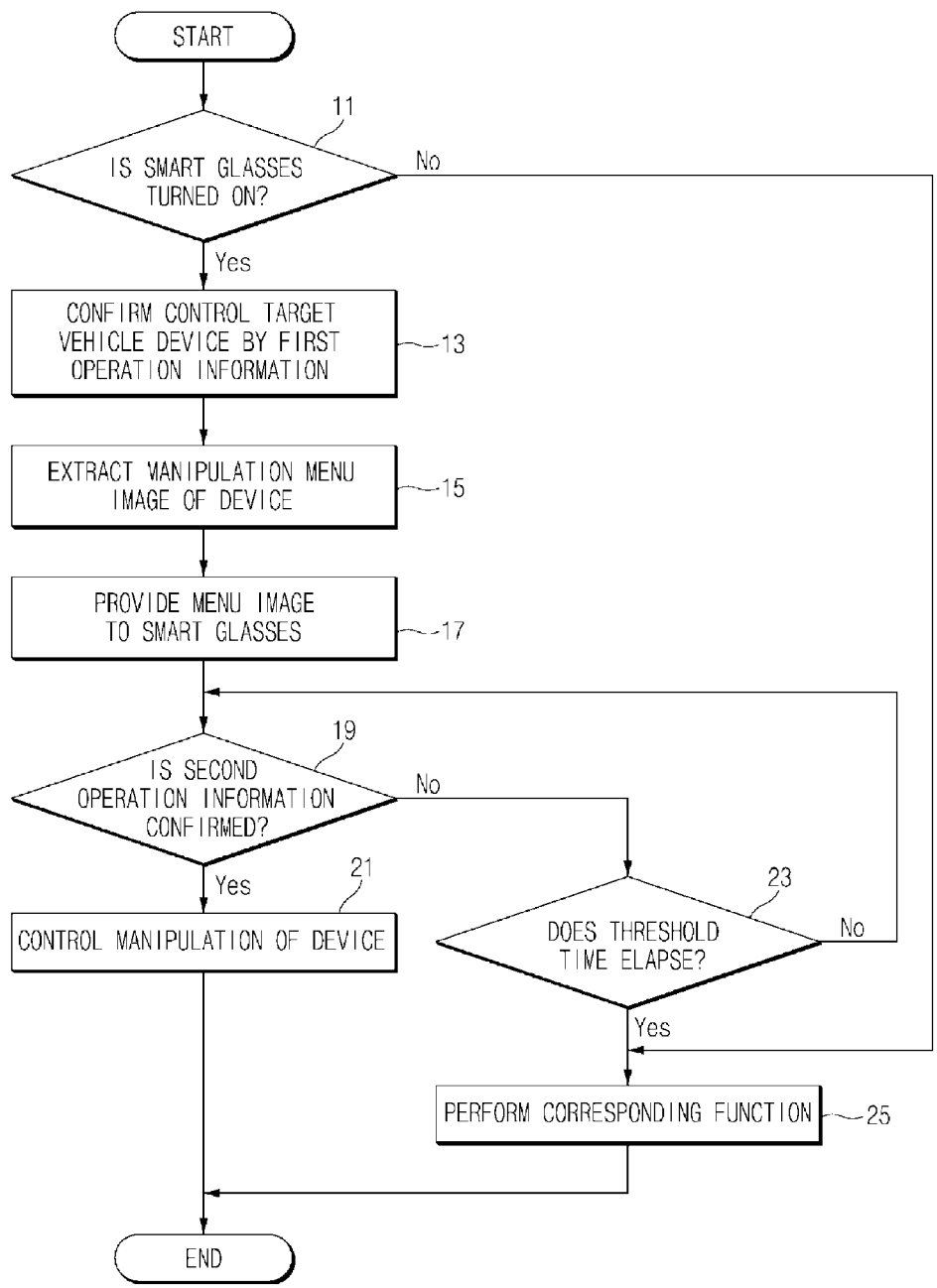
FIG. 4 is a flow chart for describing a method for controlling a vehicle using a wearable device according to embodiments of the present disclosure.

FIG. 4 is a flow chart for describing a method for controlling a vehicle using a wearable device according to embodiments of the present disclosure. Referring to FIGS. 1, 2, and 4, in operation 11, the control module 250 may confirm whether the smart glasses 100 is turned on, such that it is in a state in which wireless communication with the smart glasses 100 is possible. When it is confirmed in operation 11 that the wireless communication with the smart glasses 100 is possible, the control module 250 may perform operation 13, and when it is confirmed in operation 11 that the wireless communication with the smart glasses 100 is not possible, the control module 250 may perform operation 25. In operation 25, the control module 250 may perform a function of the control apparatus 200 itself. In addition, in the case in which the AVN system is operated as the control apparatus 200, the AVN system may continuously perform functions that are being performed, such as music playing, navigation, and the like.

In operation 13, the control module 250 may confirm the vehicle device 300 that becomes the control target that is to be controlled using the smart glasses 100 among one or more vehicle devices 300 based on the first operation information of the smart glasses 100. Although the case in which the first operation information is generated by analyzing the image projected on the smart glasses 100 in the control module 250 has been described by way of example in the following embodiments, the present disclosure is not necessarily limited thereto. The smart glasses 100 may analyze the image projected thereon to generate the first operation information and transmit the first operation information to the control module 250.

The smart glasses 100 may capture the image projected thereon and provide the image to the control module 250. When it is confirmed that a change is not generated in the image projected on the smart glasses 100 for a threshold time, the smart glasses 100 may capture the projected image. The control module 250 may analyze the image provided from the smart glasses 100 to confirm the vehicle device 300 corresponding to the image positioned at a specific position, for example, the center, of the image.

The smart glasses 100 may capture the image projected thereon and provide the image to the control module 250. Here, the image may include an image for a mark allowing kinds of vehicle devices 300 to be distinguished from each other. The kind of vehicle device 300 mapped to the mark may be learned and stored in the memory 240. The control module 250 may search the memory 240 to confirm the vehicle device 300 mapped to the mark included in the image.

The smart glasses 100 may obtain position information of the smart glasses 100. The smart glasses 100 may capture the image including the eyeball of the user projected on the smart glasses 100. The position information or the image of the smart glasses 100 may be provided to the control module 250. The position information may be the direction information of the smart glasses 100. The image may include an image of the eyeball that may confirm sight line information of the user wearing the smart glasses 100.

The smart glasses 100 may include a camera (not shown) to obtain an image for an eyeball position of the user and provide the image to the control module 250. The control module 250 may confirm the image to confirm the vehicle device 300 positioned at a point that the user gazes.

In operation 15, the control module 250 may extract the menu image for manipulating the confirmed vehicle device 300. For example, the control module 250 may extract a menu image for manipulating the AVN system when the confirmed vehicle device 300 is the AVN system and extract a menu image for manipulating an operation of the window when the confirmed vehicle device 300 is the window switch. In operation 17, the control module 250 may provide the extracted menu image to the smart glasses 100. Here, the menu image is not an image for an actual input means for manipulating the vehicle device 300, but may be a menu image in which a form of the input means is simplified.

In operation 19, the control module 250 may perform operation 21 when the second operation information of the smart glasses 100 is confirmed. Here, the second operation information may be generated from information such as a gaze point of the user wearing the smart glasses 100, blink of the user, movement of a pupil of the user, a touch of the smart glasses 100, a voice of the user, and the like. In operation 21, the control module 250, which is a function corresponding to the received second operation information, may control a manipulation of the vehicle device 300.

In operation 19, the control module 250 may perform operation 23 when the second operation information of the smart glasses 100 is not confirmed. In operation 23, the control module 250 may perform operation 25 when the second operation information is not confirmed for a threshold time. In operation 25, the control module 250 may continuously maintain communication with the smart glasses 100. Although the case in which the second operation information is generated in the control apparatus 200, similar to the first operation information, has been described in embodiments of the present disclosure, the present disclosure is not necessarily limited thereto. That is, the second operation information may also be generated by analyzing the above-mentioned information in the smart glasses 100.

As set forth above, according to embodiments of the present disclosure, the vehicle device provided in the vehicle is controlled through a wearable device (e.g., smart glasses or the like), in a state in which the driver wears the wearable device, thereby making it possible to minimize an accident occurring due to carelessness of the driver and improve convenience of the driver when the driver uses various devices provided in the vehicle.

Embodiments of the present disclosure described in the present specification and shown in the accompanying drawings only represent specific examples provided in order to easily describe technical contents of the present disclosure and assist in the understanding of the present disclosure, and are not to limit the scope of the present disclosure. Therefore, it is to be interpreted that in addition to the disclosed embodiments of the present disclosure, all modifications or alternations derived based on a technical spirit of the present disclosure are included in the scope of the present disclosure.

What is claimed is:

1. An apparatus for controlling a vehicle comprising:
a communication module configured to perform wireless communication between a wearable device and at least one vehicle device provided in the vehicle; and
a control module configured to control the at least one vehicle device based on an operation of the wearable device, wherein
the wearable device transmits an image of the at least one vehicle device projected on the wearable device to the control module, and
the control module extracts the at least one vehicle device from the image and provides a menu image for manipulating the at least one vehicle device to the wearable device.

2. The apparatus for controlling a vehicle according to claim 1, wherein the wearable device is smart glasses.

3. The apparatus for controlling a vehicle according to claim 2, wherein the control module is further configured to select the at least one vehicle device based on first operation information of the smart glasses.

4. The apparatus for controlling a vehicle according to claim 3, wherein the first operation information is generated based on one or more of: a position of the smart glasses, a gaze point of a user wearing the smart glasses, an image of the at least one vehicle device projected on the smart glasses, and an image of a mark attached to the at least one vehicle device projected on the smart glasses.

5. The apparatus for controlling a vehicle according to claim 3, wherein the control module is further configured to provide a menu for the selected at least one vehicle device to the smart glasses.

6. The apparatus for controlling a vehicle according to claim 5, wherein the control module is further configured to confirm a selection signal for the menu based on second operation information of the smart glasses and to perform a function corresponding to the selection signal.

7. The apparatus for controlling a vehicle according to claim 6, wherein the second operation information is generated based on one or more of: a gaze point of a user wearing the smart glasses, a blink of the user, movement of a pupil of the user, a touch of the smart glasses, and a voice of the user.

8. The apparatus for controlling a vehicle according to claim 6, wherein the second operation information is generated from one or more of the smart glasses and the apparatus for controlling the vehicle.

9. The apparatus for controlling a vehicle according to claim 3, wherein the first operation information is generated from one or more of the smart glasses and the apparatus for controlling the vehicle.

10. The apparatus for controlling a vehicle according to claim 1, wherein the at least one vehicle device provided in the vehicle includes one or more of: an audio-video-navigation (AVN) system, a window switch, a door switch, an air conditioning operating system, and a sheet operating system.

11. A method for controlling a vehicle comprising:
performing, by a communication module, wireless communication with a wearable device, wherein the wearable device transmits an image of at least one vehicle device provided in the vehicle that is projected on the wearable device to a control module;
extracting, by the control module, the at least one vehicle device from the image;
providing, by the control module, a menu image for manipulating the at least one vehicle device to the wearable device;
confirming, by the control module, an operation of the wearable device; and
controlling, by the control module, the at least one vehicle device based on the operation of the wearable device.

12. The method for controlling a vehicle according to claim 11, further comprising, after the performing of the wireless communication,
confirming, by the control module, first operation information of smart glasses, which is the wearable device; and
selecting, by the control module, the at least one vehicle device based on the first operation information.

13. The method for controlling a vehicle according to claim 12, wherein the first operation information is generated based on one or more of: a position of the smart glasses, a gaze point of a user wearing the smart glasses, an image of the at least one vehicle device projected on the smart glasses, and an image of a mark attached to the at least one vehicle device projected on the smart glasses.

14. The method for controlling a vehicle according to claim 12, further comprising, after the selecting of the at least one vehicle device, providing, by the control module, a menu for the selected at least one vehicle device to the smart glasses.

15. The method for controlling a vehicle according to claim 14, wherein the controlling of the at least one vehicle device includes:
confirming, by the control module, second operation information of the smart glasses after the providing of the menu to the smart glasses; and
confirming, by the control module, a selection signal for the menu based on the second operation information, the at least one vehicle device being controlled by a function corresponding to the selection signal.

16. The method for controlling a vehicle according to claim 15, wherein the second operation information is generated based on one or more of: a gaze point of a user wearing the smart glasses, a blink of the user, movement of a pupil of the user, a touch of the smart glasses, and a voice of the user.

17. A non-transitory computer readable medium containing program instructions for controlling a vehicle, the computer readable medium comprising:
program instructions that perform wireless communication with a wearable device, wherein the wearable device transmit an image of at least one vehicle device provided in the vehicle that is projected on the wearable device;
program instructions that extract the at least one vehicle device from the image;
program instructions that provide a menu image for manipulating the a least on vehicle device to the wearable device;
program instructions that confirm an operation of the wearable device; and
program instructions that control the at least one vehicle device based on the operation of the wearable device.

* * * * *